Oct. 23, 1923.
O. ERICKVAM
1,471,889
SAFETY KNIFE FOR TRIMMING SHOE SOLES
Filed May 27, 1921
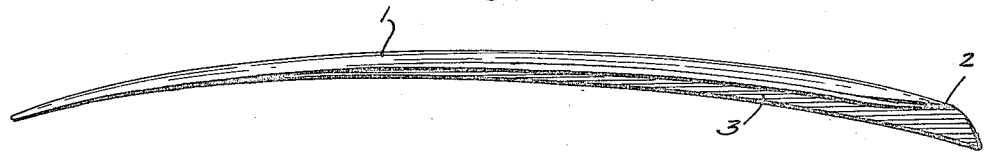
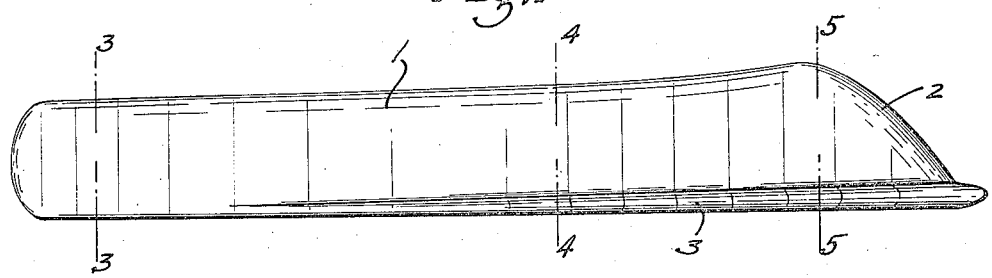
 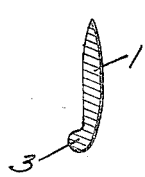 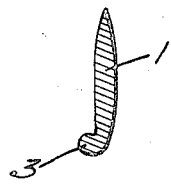
INVENTOR
Ole Erickvam
BY HIS ATTORNEY
James F. Williamson Patented Oct. 23, 1923.

1,471,889

UNITED STATES PATENT OFFICE.

OLE ERICKVAM, OF PRAIRIE FARM, WISCONSIN.

SAFETY KNIFE FOR TRIMMING SHOE SOLES.

Application filed May 27, 1921. Serial No. 473,022.

*To all whom it may concern:*

Be it known that I, OLE ERICKVAM, a citizen of the United States, residing at Prairie Farm, in the county of Barron and State of Wisconsin, have invented certain new and useful Improvements in Safety Knives for Trimming Shoe Soles; and I do hereby declare the following to be a full, clear, and exact description of the invention, such as will enable others skilled in the art to which it appertains to make and use the same.

This invention relates to a knife and preferably to a knife particularly adapted for use in trimming shoe soles. It is well known to cobblers and others skilled in the art that in trimming soles attached to shoes, great care must be exercised that the sharp cutting edge of the knife used does not come in contact with the upper of the shoe, else the same will be marred and damaged.

It is also convenient to have such a knife provided with a gauge means which can co-operate with the inseam crease to guide the knife and render the sole trimming operation rapid.

It is an object of this invention, therefore, to construct a sole trimming knife which can be conveniently manipulated and which is provided with a gauge and guard means adapted to co-operate with the inseam crease and upper of the shoe in the sole trimming operation.

It is also an object of the invention to provide such a knife of curved form and of integral construction whereby one portion of the same constitutes a convenient handle and the other portion thereof constitutes a cutting edge.

These and other objects and advantages of the invention will appear from the following description made in connection with the accompanying drawings, in which—

Fig. 1 is a view in side elevation of the knife;

Fig. 2 is a top plan view of the same;

Fig. 3 is a transverse section taken on the line 3—3 of Fig. 1;

Fig. 4 is a similar section on the line 4—4 of Fig. 1; and

Fig. 5 is a transverse section taken on the line 5—5 of Fig. 1.

Referring to the drawings, the knife is seen to comprise an integral piece of material, a portion 1 of which forms the body of the knife and is of comparatively thin and flat formation with one edge thereof rounded. This body portion is slightly widened at one end and formed with a curved transverse cutting edge 2 and the said body portion tapers somewhat in thickness from the cutting edge toward the other end thereof. The body portion, as shown in Fig. 2, is formed on rather a long curve and the portion remote from the cutting edge forms the handle portion, the end of which is somewhat rounded, as clearly shown in Fig. 1. The portion 1 has projecting from one longitudinal edge thereof a rib or bead 3. This portion 3 is of greatest width adjacent the cutting edge of the knife and tapers gradually toward the rear or handle end of the knife adjacent which it terminates and merges into said body portion. The bead 3 is extended beyond the cutting edge and formed with a somewhat curved point, as clearly shown in Fig. 2. As indicated in the sectional views in Figs. 4 and 5, the sides of the bead are rounded and approximately semi-circular in shape.

In operation, the end of the knife remote from the cutting edge will be grasped in the hand and the cutting edge 2 moved along against the edge of the sole to trim the same. The pointed end of the rib 3 will travel along in the crease between the sole and upper and the main body portion of the bead will, likewise, travel along in said crease. The cutting edge will thus, at all times, be held away from the upper and any danger of marring the upper thereby will be eliminated. The curved shape of the knife conforms somewhat to the curvature of the sole and facilitates the handling of the same as it is moved adjacent the sole edge.

It will, of course be understood that various changes may be made in the form, details and proportions of the device without departing from the scope of applicant's invention, which generally stated, consists in the matter shown and described and set forth in the appended claims.

What is claimed is:

1. A cobbler's knife formed of an integral piece of flat metal slightly curved longitudinally and having substantially straight diverging side edges, said knife having a cutting edge extending diagonally across one end thereof and also having a cutting edge extending partially along one side and having a bead along the opposite side extended beyond the end of said diagonal cutting edge to form a gauge.

2. A sole trimming knife comprising a body portion formed longitudinally with a curved surface and forming a handle and said portion having one end slightly widened and formed with a transverse cutting edge, a guard bead extending along one longitudinal edge of said body and projecting beyond said cutting edge.

3. The structure set forth in claim 2, the projecting portion of the bead being pointed and said bead decreasing in width from the cutting edge toward the other end of the knife body.

4. A one-piece shoe sole trimming knife comprising a longitudinally curved body portion having slightly diverging edges, one formed as a cutting edge adjacent the wide end of the knife and the other having a rounded bead extending there along, the wide end of the knife being formed on an inclined curve and also formed as a cutting edge beyond which said bead projects slightly, said bead decreasing in size toward the other end of the knife and terminating some distance therefrom, the narrow end of the knife constituting a handle.

In testimony whereof I affix my signature in presence of two witnesses.

OLE ERICKVAM

Witnesses:
CLARENCE W. MAU.
MARY LOCKE.